United States Patent
Guyomarc'h (10) Patent No.: US 9,532,024 B2
(45) Date of Patent: Dec. 27, 2016

(54) COLOR CALIBRATION AND USE OF MULTI-LED FLASH MODULES

(71) Applicant: Apple Inc., Cupertino, CA (US)

(72) Inventor: Gregory Guyomarc'h, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/257,161

(22) Filed: Apr. 21, 2014

(65) Prior Publication Data

US 2015/0304620 A1 Oct. 22, 2015

(51) Int. Cl.
*H04N 5/235* (2006.01)
*H04N 5/225* (2006.01)
*H04N 9/73* (2006.01)
*H04N 17/00* (2006.01)

(52) U.S. Cl.
CPC ............ *H04N 9/735* (2013.01); *H04N 5/2256* (2013.01); *H04N 5/2354* (2013.01); *H04N 17/002* (2013.01)

(58) Field of Classification Search
CPC ..... H04N 9/735; H04N 5/2256; H04N 5/2354
USPC ........................................................ 348/224
See application file for complete search history.

(56) References Cited

U.S. PATENT DOCUMENTS

| | | | |
|---|---|---|---|
| 6,184,925 B1* | 2/2001 | Abe et al. | 348/223.1 |
| 2006/0227085 A1 | 10/2006 | Boldt | |
| 2008/0056704 A1* | 3/2008 | Ovsiannikov | 396/234 |
| 2009/0021526 A1* | 1/2009 | Chiang et al. | 345/605 |
| 2009/0021587 A1 | 1/2009 | Snyderman | |
| 2010/0254692 A1* | 10/2010 | Kurt et al. | 396/155 |
| 2011/0187891 A1 | 8/2011 | Zhang | |
| 2013/0176482 A1* | 7/2013 | Hirasawa et al. | 348/370 |

FOREIGN PATENT DOCUMENTS

GB 2494537 A 3/2013

\* cited by examiner

*Primary Examiner* — Gevell Selby
(74) *Attorney, Agent, or Firm* — Blank Rome LLP (57) ABSTRACT

Systems, methods, and computer readable media to identify the operating characteristics of a multi-LED flash module for use with a image capture device are described. Flash modules having multiple LEDs have been found to exhibit large module-to-module variation in the light spectrum they emit. It has been determined that such variations make defining a "golden module" impractical. To overcome this and other issues, techniques to characterize the operational behavior of a flash module having multiple LEDs using easily obtained measurements are disclosed. Such characterizations permit the characterization of each flash module to account for the particular lighting capability of its specific LEDs during image capture operations.

19 Claims, 9 Drawing Sheets

FIG. 6A (NOMINAL TORCH CURRENT)

| Module | WB R Gain | | | WB B Gain | | | CCT | | |
|---|---|---|---|---|---|---|---|---|---|
| | Mean | StdDev | Max | Mean | StdDev | Max | Mean | StdDev | Max |
| A | 3.54% | 1.57% | 5.74% | 1.88% | 1.21% | 4.60% | 3.31% | 1.47% | 5.49% |
| A – Calibrated | 0.60% | 0.51% | 1.84% | 0.77% | 0.65% | 2.71% | 0.62% | 0.46% | 1.41% |
| B | 2.75% | 1.48% | 4.89% | 7.88% | 1.37% | 10.79% | 4.75% | 0.97% | 6.19% |
| B – Calibrated | 0.38% | 0.24% | 0.84% | 0.54% | 0.45% | 1.75% | 0.33% | 0.31% | 0.95% |
| C | 0.65% | 0.35% | 1.28% | 0.85% | 0.78% | 2.83% | 0.80% | 0.43% | 1.55% |
| C – Calibrated | 0.52% | 0.21% | 0.74% | 0.57% | 0.34% | 1.30% | 0.59% | 0.32% | 1.06% |
| D | 0.45% | 0.29% | 1.08% | 1.18% | 0.41% | 2.07% | 0.28% | 0.29% | 0.98% |
| D – Calibrated | 0.26% | 0.20% | 0.68% | 0.39% | 0.31% | 1.17% | 0.27% | 0.26% | 1.10% |
| E | 2.21% | 0.96% | 3.68% | 7.15% | 2.03% | 10.94% | 4.22% | 0.94% | 5.53% |
| E – Calibrated | 0.33% | 0.37% | 1.23% | 0.40% | 0.24% | 0.86% | 0.43% | 0.51% | 1.48% |
| F | 2.71% | 0.68% | 3.44% | 1.37% | 0.90% | 2.95% | 2.46% | 1.00% | 3.51% |
| F – Calibrated | 0.71% | 0.42% | 1.29% | 0.43% | 0.41% | 1.81% | 0.66% | 0.46% | 1.36% |

COLOR CALIBRATION AND USE OF MULTI-LED FLASH MODULES

BACKGROUND

Color temperature (expressed in degrees Kelvin, K) is a characteristic of visible light and corresponds to the temperature of an ideal black body radiator that radiates light of comparable hue to that of the light source. While many light sources approximate black body radiators (e.g., incandescent lights), many do not (e.g., fluorescent lamps). These latter types of sources are assigned what is known as a color corrected temperature (CCT). A sources' CCT is the color temperature of a black body radiator which to a human most closely matches the light of the source. Color temperatures over 5,000K are typically referred to as cool colors (bluish white), while lower color temperatures (e.g., 2,700K-3,000K) are often referred to as warm colors (yellowish white through red). This becomes significant because the color of an object is affected by the lighting conditions under which it is viewed; that is, the scene's illuminant color. Human visual systems quickly and accurately adjust to different color temperatures so that a white object appears white to us whether it's viewed in sunlight, under overcast skies or indoors under incandescent or fluorescent light.

Digital image sensors do not naturally alter what they record as a function of illuminant color as does the human eye. The process by which a digital image system compensates for differently colored light sources is known as white balance. Automatic white balance (AWB) is integral to many digital image capture systems. The purpose of all AWB systems is to neutralize or compensate for any cast created by the color(s) of the light source(s) so that all the colors (not just white) appear as seen by a human observer at the time the image was captured. In practice, white balance allows a remapping of color values to simulate variations in ambient color temperature. An incorrect white balance can cause color shifts in a captured image.

SUMMARY

In one embodiment the disclosed concepts provide a method to characterize a multi-LED flash module of the type typically used in digital photography. The method includes causing a multi-LED flash module to emit light at a number of specified drive levels (each drive level specifies a drive value for each of the flash module's multiple LEDs—each drive value corresponding to a fraction of the flash module's total available current). Coincident with light emission an image may be captured and, from each image, at least one raw chromaticity value extracted. The flash module may be characterized using the raw chromaticity values and optionally one or more luminance ratios between the flash module's LEDs. A characterization in accordance with this disclosure describes a flash module's chromaticity profile as a function of the module's total drive current and the fraction of the total drive current used to drive one or more of the flash module's LEDs. The process described here may be embodied in computer executable instructions that may be stored in a non-transitory memory (storage). Such non-transitory memories may be a part of an image capture device.

In another embodiment the disclosed concepts provide an image capture device that includes a digital image color sensor, a lens assembly to focus light on the digital image color sensor, a flash module having a plurality of light sources, a memory to store images captured by the digital image color sensor and one or more processors communicatively coupled to the memory, the flash module and having stored therein instructions to cause a digital image capture device to capture an image of a scene at a first light source drive ratio (the first light source drive ratio identifying a first drive value for each of the plurality of light sources in the flash module). From the image, obtain at least one RAW chromaticity value for each of the plurality of light sources and convert that value into a color space value (one for each RAW chromaticity value and light source). RAW to color space conversion factors for each light source and a blending function that characterizes the flash module's operation in a strobe mode may be obtained from the memory. A second drive value for each light source may be determined based on the light source's color space value and RAW to color space conversion factor, and the flash module's blending function. The second drive values may, in turn, be used to drive the flash module's light sources to generate a strobe. Concomitant with the generated strobe, a second image may be captured and stored in the memory. In addition, the memory that stores the above described instructions may be a separate unit in itself.

BRIEF DESCRIPTION OF THE DRAWINGS

FIG. 7 shows the numerical data on which FIGS. 6A and 6B are based.

DETAILED DESCRIPTION

This disclosure pertains to systems, methods, and computer readable media to identify the operating characteristics of a multi-LED flash module for use with a image capture device. Flash modules having multiple LEDs have been found to exhibit large module-to-module variation in the light spectrum they emit. It has been determined that such variations make defining a "golden module" impractical. To overcome this and other issues, techniques to characterize the operational behavior of a flash module having multiple LEDs using easily obtained measurements are disclosed. Such characterizations permit each flash module to account for the particular lighting capability of its specific LEDs during image capture operations.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of image capture systems having the benefit of this disclosure.

As used herein the phrase "image capture device" refers to any device that can electronically capture an image of a scene and which includes flash capability. Illustrative image capture devices include cameras and video recorders. Image capture devices in accordance with this disclosure may be incorporated into any number of electronic components including, for example, desktop computer systems, portable computer systems, tablet computer systems, mobile telephones, portable entertainment devices (e.g., music players and gaming devices), personal digital assistant devices, and stand-alone camera or video units. Image capture devices in accordance with this disclosure include one or more flash modules controlled by electronic circuits coupled to an image sensor.

In the following, a flash module having two LEDs is characterized. More particularly, one LED may emit a cool-white light and the other an amber light (abbreviated C and A respectively). As will be recognized, a camera's lighting system may generally be operated in one of two modes: a "strobe" mode which can be sustained at high total currents, but only for short time periods (this is the mode often used during still-image capture); and a "torch" mode which can last for long periods of time, but at low total current (this is the mode often used during video capture and still image pre-flash operations).

At the functional level, operation of a dual-LED system may be defined as a function of two variables: the total current supplied to the LED pair (total) and the percentage of that current going to arbitrarily selected one of the LEDs (ratio). Determination of the appropriate ratio given a total current and a target white-point/CCT requires knowledge of the system's transfer function, defined as $f$:

$$f:[0,I_{high}] \times [0,1] \to \Re^2$$

$$(\text{total},\text{ratio}) \mapsto (x,y), \qquad \text{EQ. 1}$$

where $I_{high}$ represents the highest or maximum current applied to the flash module and (x, y) are the raw chromaticities of the dual-LED's white-point (see discussion below).

Figure 1:
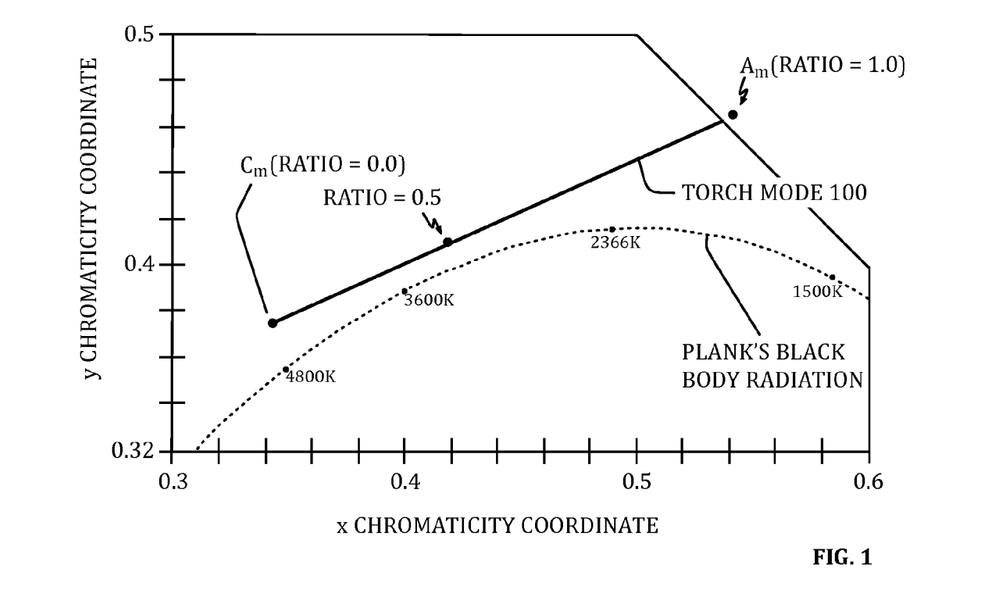
FIG. 1 shows, in accordance with one embodiment, illustrative dual-LED module response curves in the CIE 1931 XYZ color space.

It has unexpectedly been found that the transfer function $f$ may be determined for a known flash module given three (3) raw RGB triplets corresponding to a gray patch measured by the image sensor coupled to the flash module. These measurements may be taken, for example, during a camera's manufacturing process (e.g., as part of a quality control process). All three measurements may be performed in torch mode with a fixed total current (total), but with three different 'ratio' values (e.g., 0.0, 0.5 and 1.0). Referring to FIG. 1, illustrative torch mode emission results 100 for a given flash module are shown based on the specified ratios: 0.0 ($A_m$); 0.5; and 1.0 ($C_m$). One of ordinary skill in the art will recognize that FIG. 1 represents a portion of the chromaticity space as described by the CIE 1931 XYZ color space.

In one embodiment, raw chromaticities may provide a means to use a camera's image sensor as a colorimeter. Given a triplet of raw RGB values from the image sensor, raw XYZ values may be defined as:

$$\begin{pmatrix} X \\ Y \\ Z \end{pmatrix} = [M_{RGB \to XYZ}] \begin{Bmatrix} R - BL_R \\ G - RL_G \\ B - BL_B \end{Bmatrix}, \qquad \text{EQ. 2}$$

where X, Y, and Z are tristimulus values and collectively represent the CIE standard observer, and $BL_R$, $BL_G$ and $BL_B$ are the image sensor's black levels for the red, green and blue channels respectively. The 3×3 matrix $M_{RGB \to XYZ}$ translates sensor raw RGB values into raw XYZ values and may be determined from an image sensor's golden module spectral responses $S_R$, $S_G$, $S_B$ and the CIE color matching functions $S_X$, $S_Y$, and $S_Z$ as follows:

$$[M_{RGB \to XYZ}] = [S_x|S_y|S_z]^T \text{Pseudo-Inverse}([S_R|S_G|S_B]^T), \qquad \text{EQ. 3}$$

where $S_R$, $S_G$, $S_B$, $S_x$, $S_y$, and $S_z$ are vectors representing the normalized spectral responses sampled at a common set of wavelengths.

The definition of the corresponding xy chromaticities follows the standard derivation from the CIE XYZ values:

$$x = \frac{X}{X + Y + Z} \qquad \text{EQ. 4}$$

$$y = \frac{Y}{X + Y + Z}.$$

Also, the Y component may be used as a definition for luminance.

Figure 2:
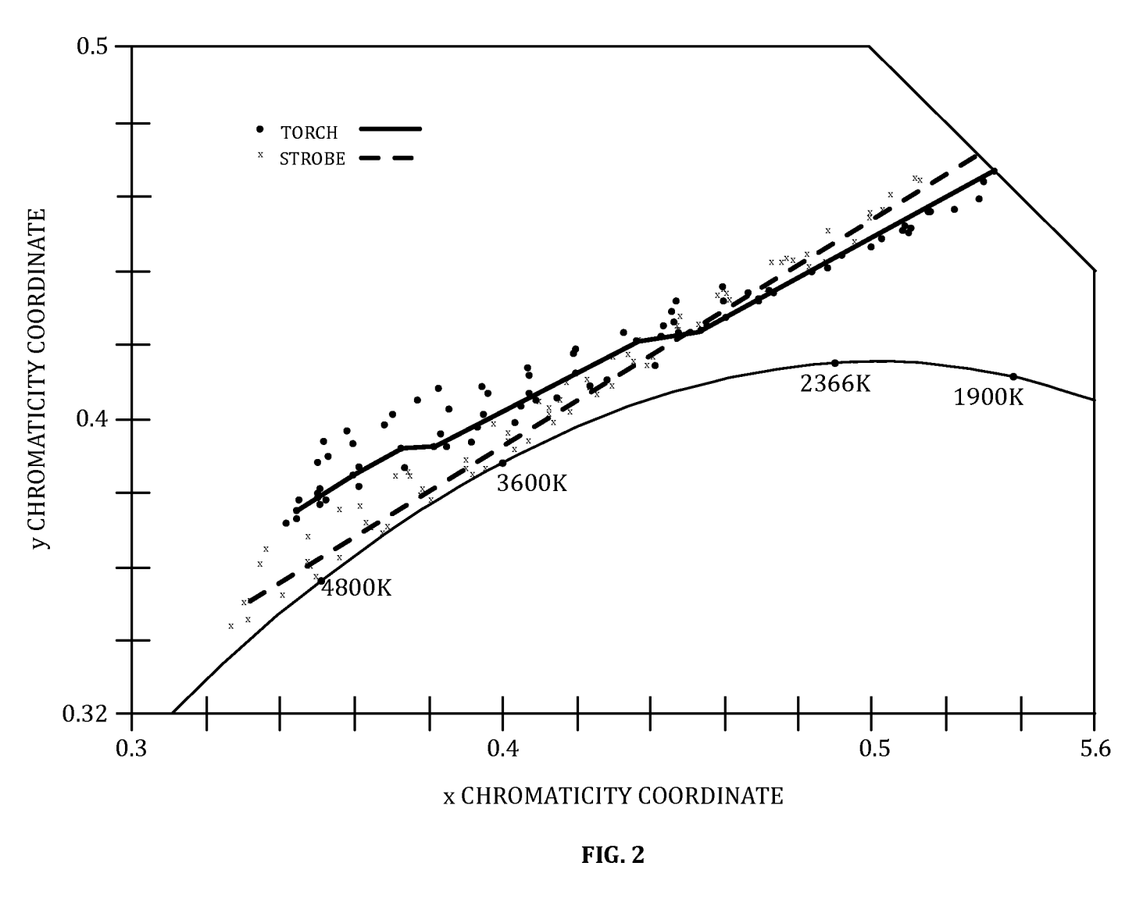
FIG. 2 shows illustrative flash module spectra in accordance with one embodiment.

Referring to FIG. 2, typical variations of white-point emission characteristics encountered during an illustrative production run at the torch and strobe nominal currents is shown (e.g., 90 mA and 1,200 mA respectively). As is standard practice in the field, the golden module represents the most likely module (in a statistical sense) according to data gathered on production lines. From FIG. 2, it is clear that the golden module white-points may not be representative of the actual white-points. While the precision might be sufficient for ambient light matching, it has been found that the predicted white-points using a golden module approach cannot, in general, be used to derive accurate white-balance gains.

Parameterization of system transfer function $f$ for a given dual-LED flash module m, may be expressed as:

$$f_m(\text{total,ratio}) = A_m(\text{total}) \times s_{m,total}(\text{ratio}) + C_m(\text{total}) \times (1 - s_{m,total}(\text{ratio})), \quad \text{EQ. 5}$$

where $A_m(\text{total})$ or $A_m$ and $C_m(\text{total})$ or $C_m$ are the (x, y) coordinates of the amber and cool-white LEDs when lit individually at total current, and $s_{m,total}$ represents the parameterization of the line from $A_m$ to $C_m$ (see FIGS. 1 and 2). In other words:

$$s_{m,total}:[0,1] \rightarrow [0,1]. \quad \text{EQ. 6}$$

It may be noted, EQs. 5 and 6 are an approximation that assumes mixing the current in each LED in accordance with a specified ratio is equivalent to mixing each LED's chromaticities by some amount s varying with that ratio (along a straight line in chromaticity space). In practice, the location of $A_m$ and $C_m$ in chromaticity space has been found to depend on the total current. This leads to deviations from the assumed "straight line" relationship. While each LED's location in chromaticity space may drift significantly with the applied current, it has been unexpectedly determined that the relative position of the LEDs in chromaticity space for a given module does not change much.

This observation suggests that the measured location (in, for example, the XYZ color space) of the two LEDs at a given fixed current may be used to derive their locations at other currents through a 2×2 transform, M:

$$A_m(\text{total}) = M_A(\text{total}) A_m(\text{torch})$$

$$C_m(\text{total}) = M_C(\text{total}) C_m(\text{torch}), \quad \text{EQ. 7}$$

where torch is the nominal torch current through the LED pair (e.g., 70-100 mA). The matrices $M_A$ and $M_C$ may be determined using a training set of dual-LED flash modules and solving EQ. 7 for all possible currents (e.g., using least squares, stochastic hill climbing, gradient descent, . . . ).

To decouple $s_{m,total}$ in EQ. 5, the module's luminance ratio $\alpha_m(\text{total})$ may be used. If $Y_{m,A}(\text{total, ratio})$ represents the luminance of a module's amber LED and total, ratio) the luminance of the module's cool-white LED, a module's luminance ratio may be defined as:

$$\alpha_m(\text{total}) = \frac{Y_{m,C}(\text{total}, 0)}{Y_{m,A}(\text{total}, 1)}, \quad \text{EQ. 8}$$

where $Y_{m,C}$ (total, 0) represents the luminance response of a module's cool-white LED when lit individually at total current (i.e., ratio=0), and $Y_{m,C}$ (total, 1) represents the luminance response of the module's amber LED when lit individually at total current (i.e., ratio=1). In practice it has been found, to first order, that this ratio does not depend on total and can, therefore, be treated as a constant characteristic of a given LED module. In other words:

$$\alpha_m(\text{total}) = \alpha_m. \quad \text{EQ. 9}$$

Now consider the luminance response of each LED normalized to their maximum luminance:

$$\overline{Y}_{m,C}(\text{total, ratio}) = \frac{Y_{m,C}(\text{total, ratio})}{Y_{m,C}(\text{total, 0})} \quad \text{EQ. 10}$$

and $$\overline{Y}_{m,A}(\text{total, ratio}) = \frac{Y_{m,A}(\text{total, ratio})}{Y_{m,A}(\text{total, 1})}.$$

Figure 3:
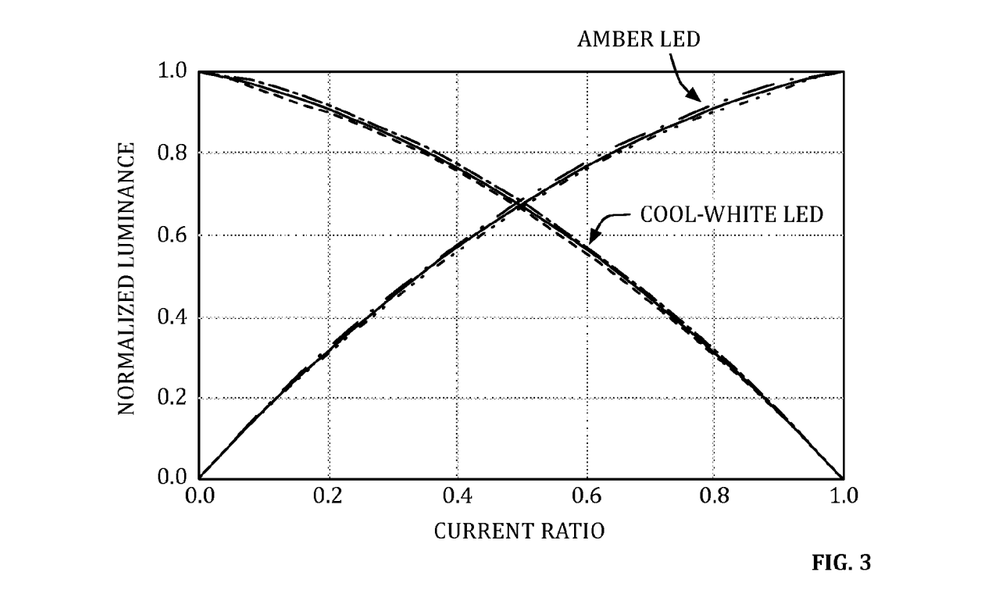
FIG. 3 shows the chromaticity response for a set of dual-LED modules in accordance with one embodiment.

Referring to FIG. 3, EQ. 10 is illustrated for a set of dual-LED flash modules using the strobe nominal current as the total current (e.g., 1,000-1,400 mA). As suggested by FIG. 3, each of the functions given in EQ. 10 may be approximated by fixed functions, one per LED, valid across all modules (see FIG. 3). Accordingly, $$\overline{Y}_{m,C}(\text{total,ratio}) = \overline{Y}_C(\text{ratio})$$

$$\overline{Y}_A(\text{total,ratio}) = \overline{Y}_A(\text{ratio}). \quad \text{EQ. 11}$$

By defining the contribution of the cool-white LED to the total luminance at a given current ratio, the following may be obtained:

$$p_m(\text{total, ratio}) = \frac{Y_{m,C}(\text{total, ratio})}{Y_{m,C}(\text{total, ratio}) + Y_{m,A}(\text{total, ratio})}, \quad \text{EQ. 12}$$

which can be simplified by applying the normalized luminance Y and the module-dependent luminance ratio $\alpha_m$:

$$p_m = \frac{\alpha_m \overline{Y}_C(\text{ratio})}{\alpha_m \overline{Y}_C(\text{ratio}) + \overline{Y}_A(\text{ratio})}. \quad \text{EQ. 13}$$

The function $p_m$ defined in EQ. 13 has been found to be strictly increasing and can be used to define a line coordinate function $\overline{s}$ that is independent of a dual-LED module such that:

$$s_m(\text{total,ratio}) = \overline{s}_{m,total} \circ p_m(\text{ratio}), \quad \text{EQ. 14}$$

where the "$\circ$" symbol represents the composition operator.

Figure 4A:
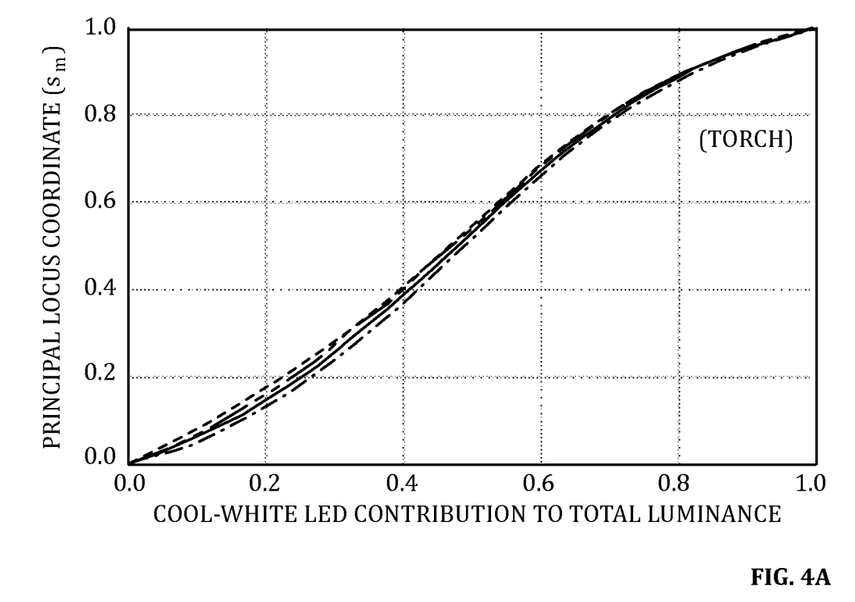
FIGS. 4A and 4B show illustrative line coordinate functions across multiple modules in accordance with one embodiment.
Figure 4B:
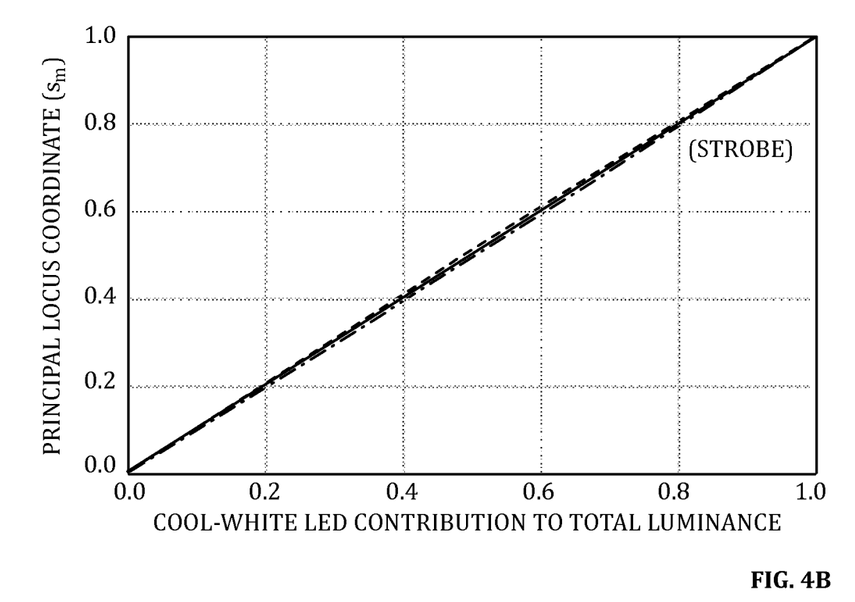

Referring to FIGS. 4A and 4B, it may be seen that $\overline{s}_m$ for multiple modules at the nominal torch and strobe currents (e.g., 90 mA and 1,200 mA respectively), are very stable and can be characterized just once (one function for each total current):

$$\overline{s}_{m,total} = \overline{s}_{total}. \quad \text{EQ. 15}$$

Combining EQS. 1 through 15, a dual-LED flash module system transfer function for characterization may be expressed as:

$$f_m(\text{total,ratio}) = M_A(\text{total}) A_m(\text{torch}) \times \overline{s}_{total} \circ p_m(\text{ratio}) + M_C(\text{total}) C_m(\text{torch}) \times (1 - \overline{s}_{total} \circ p_m(\text{ratio})) \quad \text{EQ. 16}$$

where $A_m$, $C_m$ and indirectly $p_m$ (which depends on $\alpha_m$) are per-module variables.

Figure 5:
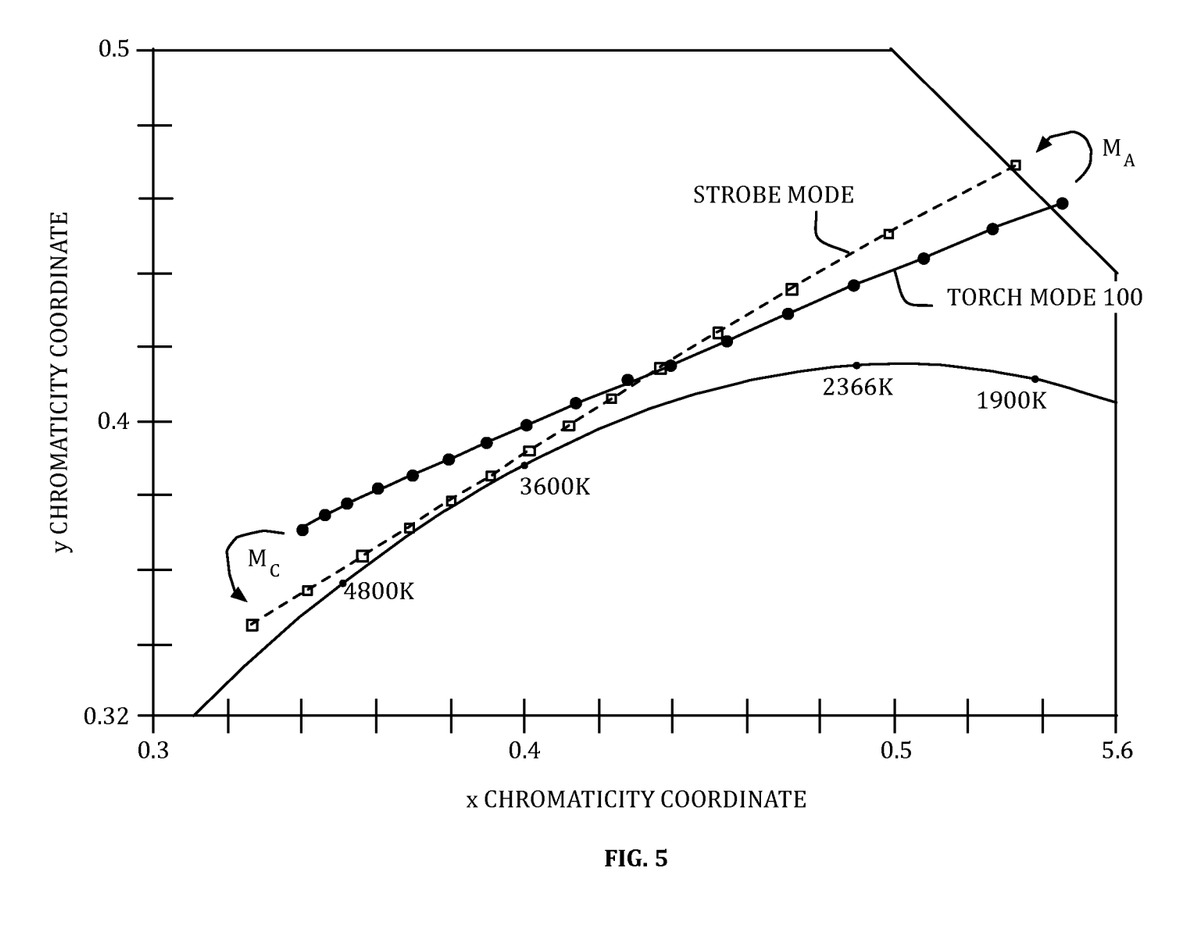
FIG. 5 shows the result of the disclosed parameterization on a sample module against measured values in accordance with one embodiment.

Strictly speaking, $\alpha_m$ could be measured at any current and, in particular, from the knowledge of the two already required/measured data points $A_m$ and $C_m$. It has been found, however, these luminance measurements can be unstable across different modules when performed at the low currents typically used in torch mode (e.g., 70 mA-100 mA). Instead, a third point $H_m$ with ratio=0.5 may be measured (also in torch mode). Given $A_m$, $C_m$ and $H_m$, a value for $\alpha_m$ may be determined such that $f_m(\text{torch}, 0.5) = H_m$; whereafter $f_m$ is completely defined. FIG. 5 shows the result of the parameterization on a sample module against measured values in accordance with one embodiment.

Figure 6A:
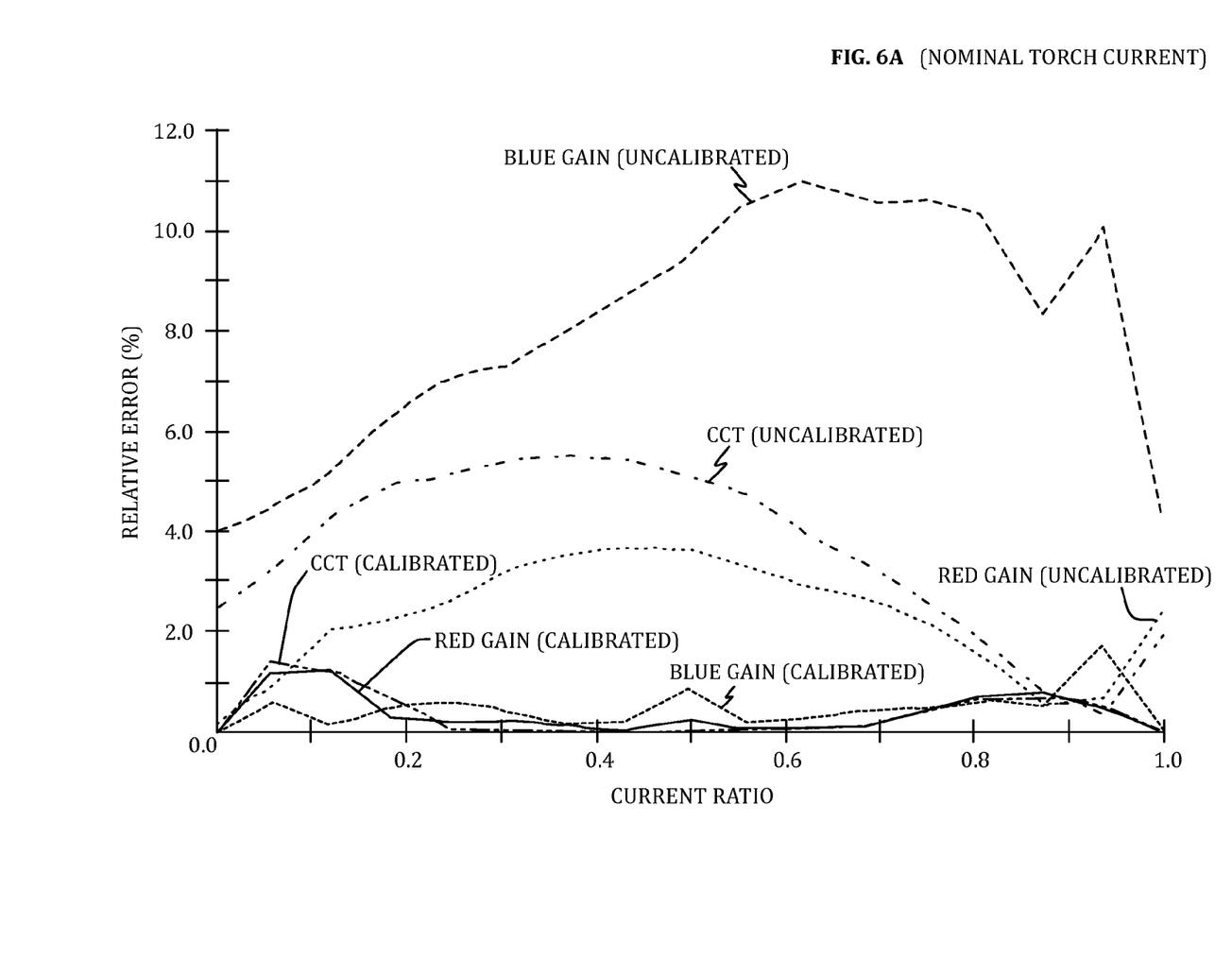
FIG. 6A (torch mode at nominal current) and 6B (strobe mode at nominal current) compare the relative error of the white balance gains and CCT estimated in two ways for a limit sample module: in accordance with this disclosure and based on a golden module.
Figure 6B:
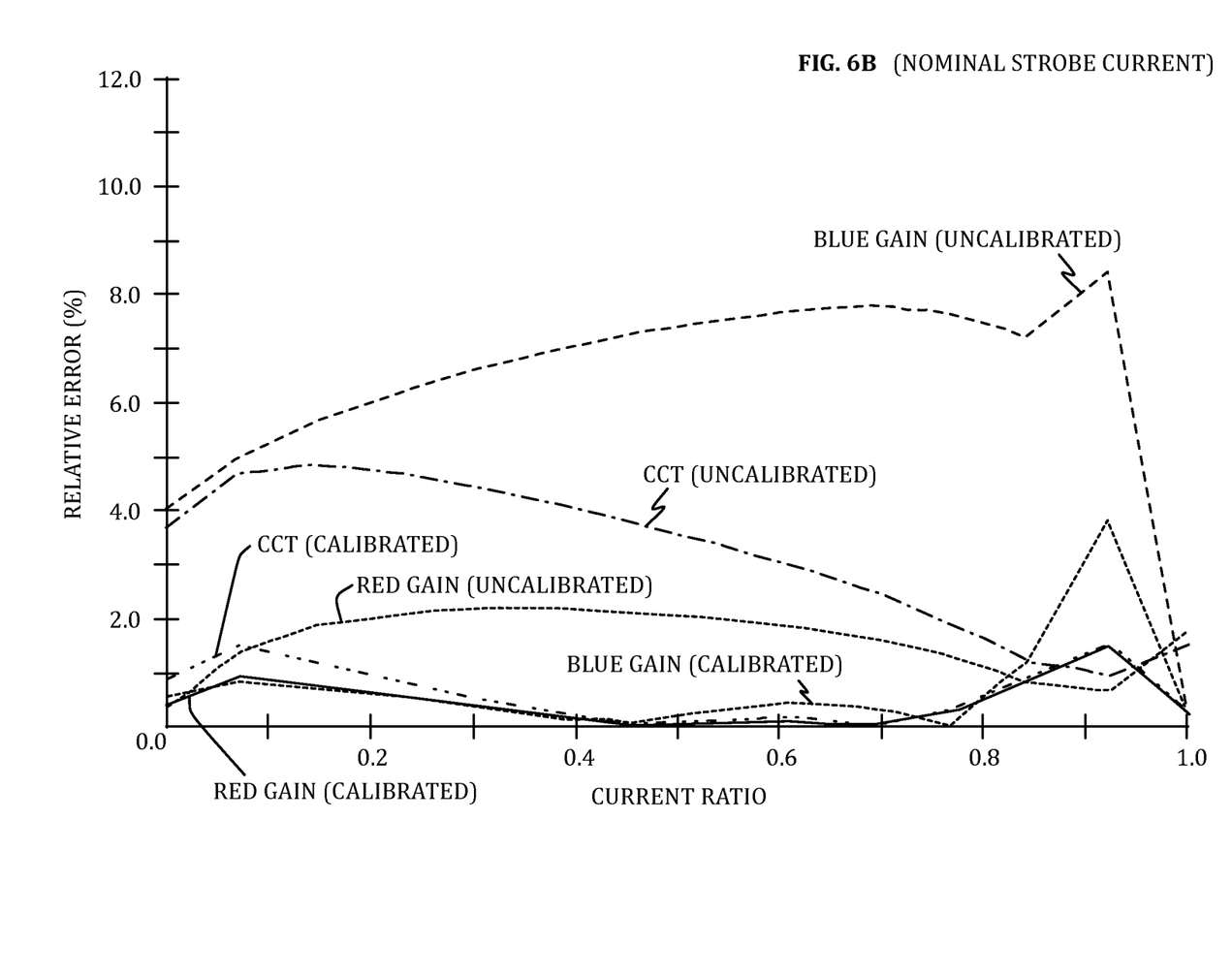
Figure 7:
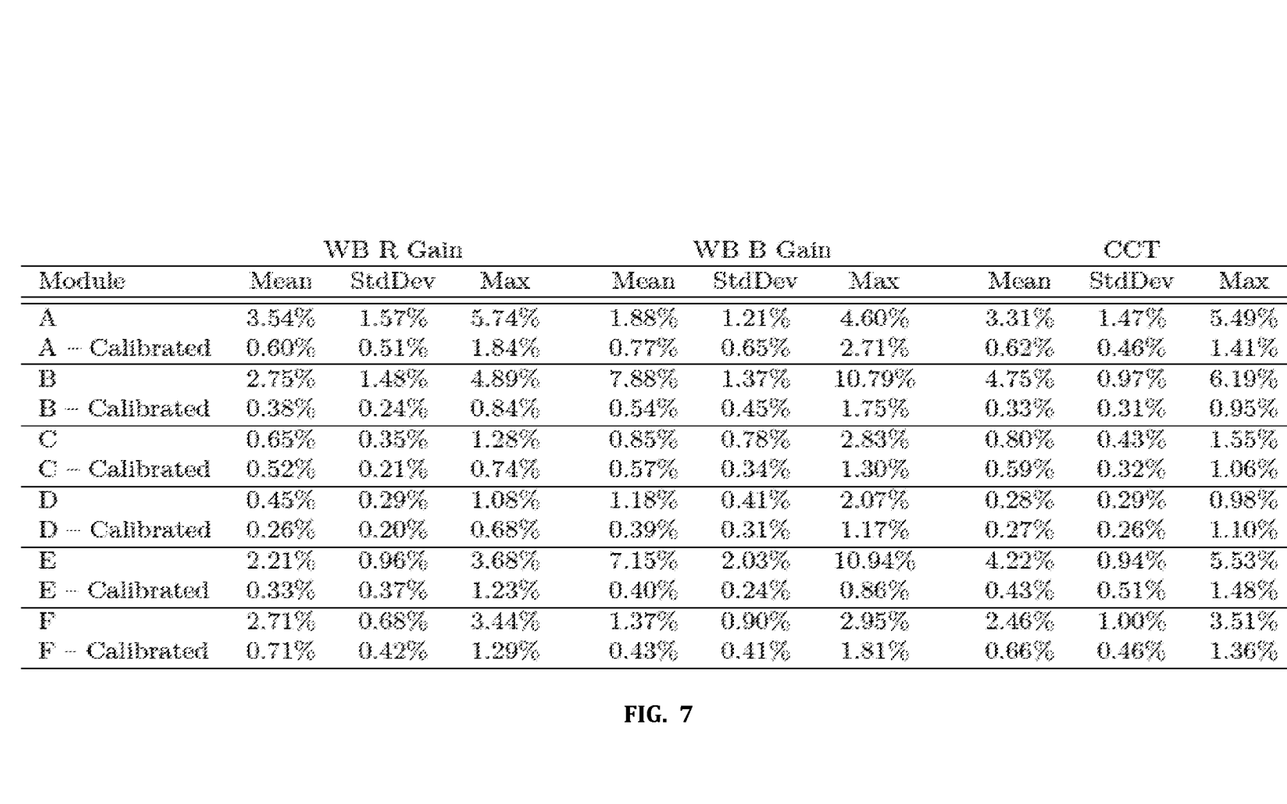

FIG. 6A (for torch mode at nominal current) and 6B (for strobe mode at nominal current) compare the relative error of the white-balance gains and CCT estimated in two ways for a limit sample module: per-unit calibration method in accordance with EQ. 16 (CALIBRATED) or when the characterization is based on a golden module (UNCALIBRATED). FIG. 7 presents the numerical data from which FIGS. 6A and 6B were generated. As shown by FIGS. 6A and 6B, the improvement in accuracy of white-point gain estimation can be substantial. (FIG. 6 is based on flash modules in which the nominal torch mode total current is 90 mA, the typical strobe mode total current is 1,200 mA, and where ratio ∈ [0.0, 0.6].)

Models in accordance with the characterization provided by EQ. 16 use the ratio of luminance between LEDs. Yet, the approach itself does not rely on luminance measurements at all (which may be unreliable at low operating currents). Instead, the luminance ratio may be estimated by analyzing the relative locations of the designated measurement points (e.g., three) in the x-y colorimetric space shown in FIGS. 1-5. It should be understood, the measurement points used herein are not necessary to the disclosed methodology, any three (or more) measurements may be used. In addition, while the disclosed module calibration technique uses torch mode, strobe mode may also be used. It should also be noted, no particular colorimetric measurement equipment is required in accordance with this disclosure as the flash module's corresponding camera's image sensor may be used. And, while the disclosed embodiments were described in the context of a dual, or two LED module, the approach can easily be extended to an arbitrary number of LEDs (adding two measurements for each extra LED). For example, when three LEDs are used, there would be two ratios instead of one and twos functions instead of one. In addition, the straight line parameterization described herein may be extended to a general parameterization using, for example, barycentric coordinates. In summary, a dual-LED flash module may be used to capture raw RGB values (e.g., at $f_m$(torch, 0.0), $f_m$(torch, 0.5) and $f_m$(torch, 1.0)) during, for example, manufacturing or quality control processing, so as to completely characterize that flash module's behavior as modeled by EQ. 16. During user operations, the flash module characterization provided by EQ. 16 may be used to set the current through each of the different LEDs to compensate for the scene's illuminant(s) color(s).

Figure 8:
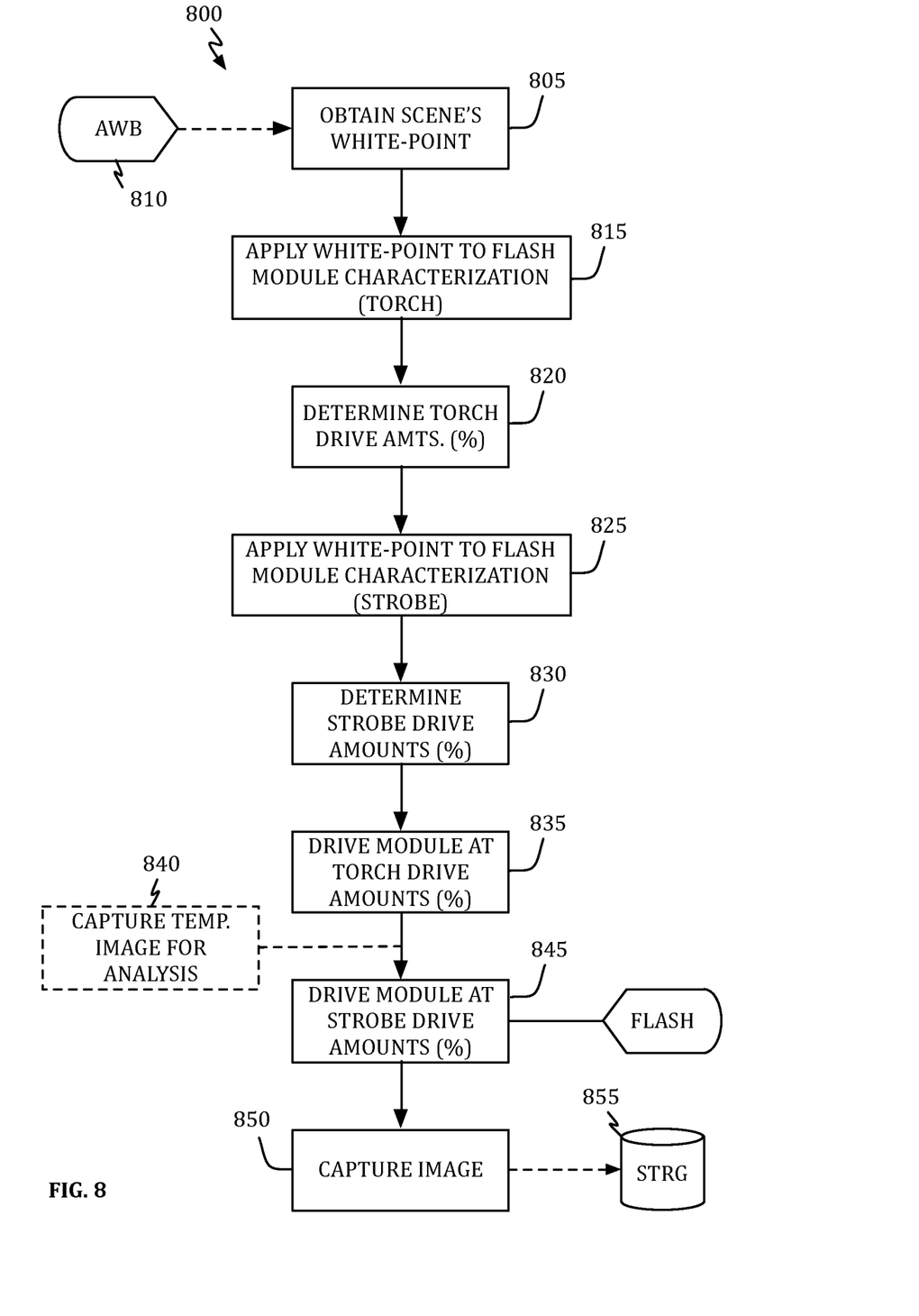
FIG. 8 shows, in flowchart form, an image capture operation in accordance with one embodiment.

Once a dual-LED flash module is characterized, $M_A$ (total), $A_m$ (torch), $M_C$ (total), $C_m$(torch) and $\bar{s}_{total}$ will be known quantities. From above it may be seen that $M_A$ (total), $M_C$ (total) and $\bar{s}_{total}$ are not dependent on the LED module; they may be measured from a set of sample modules and stored in memory for later use. On the other hand, $A_m$(torch), $C_m$(torch) and either $H_m$(torch) or the luminance ratio (see above) get measured for each flash module and could also be stored in the unit's non-volatile memory (e.g., non-volatile memory in an image capture device associated with the flash module). With these values at-hand, all of the values needed for EQ. 16 for each module. Referring to FIG. 8, one use of flash module characterization may be two-step flash operation 800. As shown, a scene's white-point may be obtained (block 805) from, for example, a camera's auto-white balance system 810. Flash module characterization provided by EQ. 16 may then be set equal to the scene's white-point at the specified total torch current (block 815) and the value ratio manipulated so as to obtain a closest or best fit; the determined ratio specifying what portion of the total torch current is to pass through each LED (i.e., each LED's "drive value") so that a generated torch light will most closely match the scene's white-point (block 820). The same procedure may be used to determine what portion of the total specified strobe current is to pass through each LED so that a generated flash will most closely match the scene's white-point (blocks 825 and 830). The torch mode LED ratio may then be used to drive the flash module's LEDs to generate a light for a first specified time period (block 835). During this time, it is common to capture a temporary image that can be used to determine such image capture parameters as focus and exposure (block 840). One of ordinary skill in the art will recognize there may be other image capture parameters determined during this time. At the end of the designated torch mode operation, the strobe mode LED ratio may be used to cause the flash module's LEDs to generate a flash (block 845). During the flash, an image of the scene may be captured (block 850) which may then be stored to memory (block 855). In another embodiment, an image may be captured without first driving the flash module's LED in torch mode. In this embodiment, the torch mode ratio (e.g., blocks 815 and 820) need not be determined.

Figure 9:
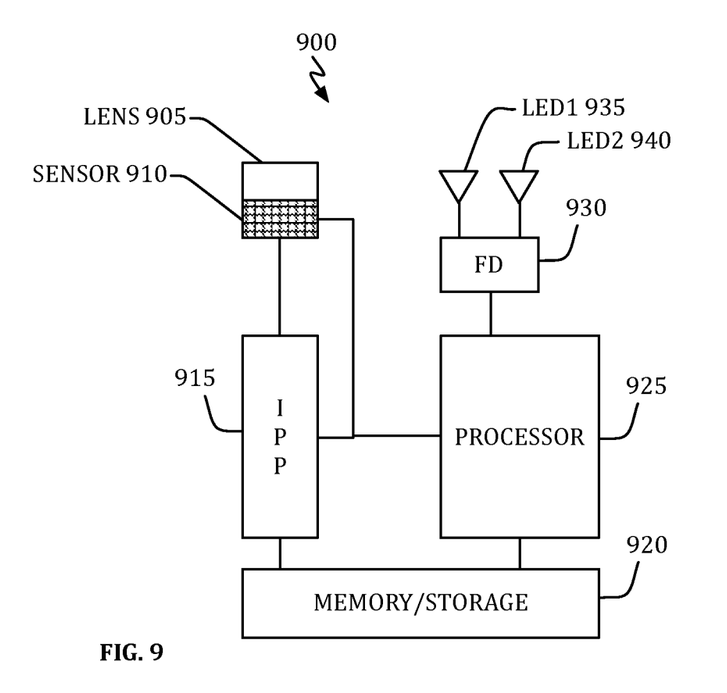
FIG. 9 shows, in block diagram form, an image capture device in accordance with one embodiment.

Referring to FIG. 9, a simplified functional block diagram of illustrative image capture device 900 is shown according to one embodiment. Image capture device 900 may capture still images and/or video images and could, for example, be a mobile telephone, personal media device, portable camera, or a tablet, notebook or desktop computer system. As shown, image capture device 900 includes lens 905, color image sensor 910, image processing pipeline 915, memory/storage 920, processor 925, flash driver 930, LED-1 935, and LED-2 940. One of ordinary skill in the art will recognize that each of the aforementioned elements (905-940) may be implemented in any number of ways. For example, lens 905 may include multiple lens (e.g., a lens stack) and may be fixedly or removably attached to a frame, housing or camera body. Sensor 910 may be fabricated in any fashion suitable for the device's intended purpose (e.g., digital charge-coupled device (CCD) or complementary metal-oxide-semiconductor (CMOS) active pixel sensor). Image processing pipeline 915 may be special purpose computational hardware designed specifically to perform the needed processing on images received from sensor 910. Processor 925 may be one or more stand-alone processors (each a single or multi-core CISC or RISC processor) or a system-on-chip and may include one or more dedicated graphics processing units (GPUs).

Either or both image processing pipeline 915 and processor 925 may be, at least partially, programmable. Programs to take advantage of this may be stored internally to each unit and/or in memory/storage 920. Memory 920/storage may also be used to store captured images or video sequences. Image processing pipeline 915 and/or processor 925 may execute the stored instructions to carry out or control the operation of many functions performed by image capture device 900 (e.g., capture information necessary for calibration operations in accordance with this disclosure). Further, image processing pipeline 915, processor 925 and flash driver 930 may also retain various embodiments of the flash module's (e.g., elements 930-940) characterization in accordance with EQ. 16.

Memory/storage 920 may include one or more different types of media used by image processing pipeline 915 and processor 925. For example, memory may include memory cache, read-only memory (ROM), and/or random access memory (RAM). Storage may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM).

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). One variation, for example, is a flash module employing more than two LEDs. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A flash module characterization method, comprising:
   driving each of a plurality of light sources in a flash module to emit light at a plurality of specified drive levels, wherein each drive level specifies a drive value for each of the plurality of light sources, and wherein each of the plurality of light sources is adapted to emit a different color of light;
   capturing an image of a specified scene at each of the plurality of drive levels;
   obtaining at least one raw chromaticity value from each of the plurality of captured images; and
   generating a characterization for the flash module based, at least in part, on the raw chromaticity values, wherein—
      the characterization characterizes a chromaticity profile of the combined plurality of light sources in the flash module, and
      the characterization identifies a flash module chromaticity value as a function of a fraction of a specified total drive quantity used to drive each of the plurality of light sources, and
   wherein the plurality of light sources comprise two light-emitting-diodes (LEDs), one light-emitting diode emitting a cool-white light and the other light-emitting diode emitting an amber light.

2. The flash module characterization method of claim 1, wherein the plurality of specified drive levels comprise three drive levels performed in a torch mode of operation with a fixed total current and with three different ratio values.

3. The flash module characterization method of claim 1, wherein generating the characterization for the flash module is further based on one or more luminance ratios between the light sources in the flash module.

4. The flash module characterization method of claim 1, wherein the drive quantity comprises current and the total drive quantity corresponds to a torch mode of operation for the flash module.

5. A non-transitory program storage device comprising instructions stored thereon to cause one or more processors to:
   obtain a white-point corresponding to a scene;
   obtain a characterization for a flash module having a plurality of light sources each light source adapted to emit a different color of light, wherein the characterization is specific to the flash module and characterizes a chromaticity emission profile of the specific combination of light sources in the flash module;
   determine a drive value for each of the plurality of light sources for a first operational mode of the flash module based on the white-point, the characterization, and a first mode total light source drive value, wherein each of the plurality of light sources has a corresponding first drive value;
   drive each of the plurality of light sources in accordance with their corresponding first drive value for a first duration to generate a first light;
   capture a first mode image of the scene concomitant with the first light; and
   store the first mode image in a memory.

6. The non-transitory program storage device of claim 5, further comprising instructions to cause the one or more processors to:
   determine a drive value for each of the plurality of light sources for a second operational mode of the flash module based on the white-point, the characterization, and a second mode total light source drive value, wherein each of the plurality of light sources has a corresponding second drive value;
   drive each of the plurality of light sources in accordance with their corresponding second drive value for a second duration to generate a second light;
   capture a second mode image of the scene concomitant with the second light; and
   store the second mode image in a memory.

7. The non-transitory program storage device of claim 6, wherein:
   the first mode total light source drive value is less than the second mode total light source drive value;
   the first duration is longer than the second duration; and
   the second light comprises a flash.

8. The non-transitory program storage device of claim 7, wherein the instructions to cause the one or more processors to determine drive values for each of the plurality of light sources for the first and second operational modes of the flash module are performed before the instructions to cause the one or more processors to generate the first or second lights.

9. The non-transitory program storage device of claim 5, wherein the instructions to cause the one or more processors to generate a first light comprise instructions to cause the one or more processors to generate a flash.

10. The non-transitory program storage device of claim 9, wherein the instructions to cause the one or more processors to determine a drive value for each of the plurality of light sources for a first operational mode of the flash module further comprise instructions to cause the one or more processors to:
    determine a drive value for each of the plurality of light sources for a second operational mode based on the white-point, the characterization, and a second mode total light source drive value, wherein each of the plurality of light sources has a corresponding second drive value; and
    drive each of the plurality of light sources in accordance with their corresponding second drive value for a second duration to generate a second light.

11. The non-transitory program storage device of claim 10, wherein:
    the second duration is longer than the first duration; and
    the second light is generated after the first light.

12. The non-transitory program storage device of claim 10, wherein the first light comprises a flash.

13. A digital image capture device, comprising:
   a image sensor;
   a lens system to focus light from a scene onto the image sensor;

an auto-white balance unit communicatively coupled to the image sensor;
a flash module comprising a plurality of light sources, each light source adapted to emit a different color of light;
a memory having processor-executable instructions stored therein and coupled to the image sensor; and
one or more processors coupled to the flash module and the memory and configured to execute the processor-executable instructions stored in the memory to—
obtain a white-point value of a scene from the auto-white balance unit,
obtain, from the memory, a characterization for the flash module, wherein the characterization is specific to the flash module and characterizes a chromaticity emission profile of the specific combination of light sources in the flash module,
determine a drive value for each of the plurality of light sources for a first operational mode of the flash module based on the white-point, the characterization, and a first mode total light source drive value, wherein each of the plurality of light sources has a corresponding first drive value,
drive each of the plurality of light sources in accordance with their corresponding first drive value for a first duration to generate a first light,
capture a first mode image of the scene concomitant with the first light, and
store the first mode image in the memory.

14. The digital image capture device of claim 13, wherein the memory further comprise processor-executable instructions to cause the one or more processors to:
determine a drive value for each of the plurality of light sources for a second operational mode of the flash module based on the white-point, the characterization, and a second mode total light source drive value, wherein each of the plurality of light sources has a corresponding second drive value;
drive each of the plurality of light sources in accordance with their corresponding second drive value for a second duration to generate a second light;
capture a second mode image of the scene concomitant with the second light; and
store the second mode image in a memory.

15. The digital image capture device of claim 14, wherein:
the first mode total light source drive value is less than the second mode total light source drive value;
the first duration is longer than the second duration; and
the second light comprises a flash.

16. The digital image capture device of claim 14 wherein the processor-executable instructions to cause the one or more processors to determine drive values for each of the plurality of light sources for the first and second operational modes of the flash module are performed before the processor-executable instructions to cause the one or more processors to generate the first or second lights.

17. The digital image capture device of claim of claim 13, wherein the processor-executable instructions to cause the one or more processors to generate a first light comprise processor-executable instructions to cause the one or more processors to generate a flash.

18. The digital image capture device of claim 17, wherein the processor-executable instructions to cause the one or more processors to determine a drive value for each of the plurality of light sources for a first operational mode of the flash module further comprise processor-executable instructions to cause the one or more processors to:
determine a drive value for each of the plurality of light sources for a second operational mode based on the white-point, the characterization, and a second mode total light source drive value, wherein each of the plurality of light sources has a corresponding second drive value; and
drive each of the plurality of light sources in accordance with their corresponding second drive value for a second duration to generate a second light.

19. The digital image capture device of claim 18, wherein:
the second duration is longer than the first duration; and
the second light is generated after the first light.

* * * * *